United States Patent
Wang et al.

(10) Patent No.: US 10,564,485 B2
(45) Date of Patent: Feb. 18, 2020

(54) LIQUID CRYSTAL DISPLAY PANEL, FABRICATION METHOD FOR THE SAME AND CURVED-SURFACE DISPLAY APPARATUS

(71) Applicant: Shenzhen China Star Optoelectronics Technology Co., Ltd., Shenzhen, Guangdong (CN)

(72) Inventors: Xiaoxiao Wang, Guangdong (CN); Peng Du, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 87 days.

(21) Appl. No.: 15/575,294

(22) PCT Filed: Jul. 20, 2017

(86) PCT No.: PCT/CN2017/093728
§ 371 (c)(1),
(2) Date: Nov. 17, 2017

(87) PCT Pub. No.: WO2018/209796
PCT Pub. Date: Nov. 22, 2018

(65) Prior Publication Data
US 2018/0335660 A1    Nov. 22, 2018

(30) Foreign Application Priority Data

May 19, 2017   (CN) .......................... 2017 1 0361257

(51) Int. Cl.
*G02F 1/1339* (2006.01)
*G02F 1/1362* (2006.01)
*G02F 1/1333* (2006.01)

(52) U.S. Cl.
CPC .... *G02F 1/13394* (2013.01); *G02F 1/133305* (2013.01); *G02F 1/136227* (2013.01);
(Continued)

(58) Field of Classification Search
None
See application file for complete search history.

(56) References Cited

U.S. PATENT DOCUMENTS 9,791,748 B2 * 10/2017 Chang .............. G02F 1/133512
2006/0215070 A1    9/2006 Taniguchi et al.
(Continued)

FOREIGN PATENT DOCUMENTS

CN         1752828 A    3/2006
CN       102073171 A    5/2011
(Continued)

OTHER PUBLICATIONS

CN2017103612573_1st Office Action.

*Primary Examiner* — Richard H Kim
(74) *Attorney, Agent, or Firm* — Andrew C. Cheng

(57) ABSTRACT

The present invention provides a liquid crystal display panel, which comprises a color film substrate, an array substrate and a liquid crystal layer sandwiched between the color film substrate and the array substrate, said array substrate has a pixel electrode where a surface is disposed with a number of recesses and a number of terraces, said number of recesses and said number of terraces are disposed in evenly intersectional arrangement, said respective recess is located at a position between two interconnected pixels, said respective recess is disposed with a first spacer, said respective terrace is disposed with a second spacer, a height of said first spacer protruded from said terrace is larger than a height of said second spacer protruded from said terrace, said first spacers and said second spacers are extended into
(Continued)

the liquid crystal layer, for support of between said color film substrate and said array substrate.

8 Claims, 3 Drawing Sheets

(52) U.S. Cl.
CPC ............... *G02F 1/133345* (2013.01); *G02F 2001/13396* (2013.01); *G02F 2001/136222* (2013.01); *G02F 2001/136236* (2013.01)

(56) References Cited

U.S. PATENT DOCUMENTS

| | | | |
|---|---|---|---|
| 2016/0170273 A1 | 6/2016 | Lee | |
| 2016/0349562 A1 | 12/2016 | Hashimoto | |
| 2017/0285424 A1* | 10/2017 | Kwak | ............... G02F 1/136204 |

FOREIGN PATENT DOCUMENTS

| | | |
|---|---|---|
| CN | 103543564 A | 1/2014 |
| CN | 104049418 A | 9/2014 |
| CN | 104375331 A | 2/2015 |
| CN | 104483773 A | 4/2015 |
| CN | 106094360 | 11/2016 |
| KR | 20070013574 A | 1/2007 |

\* cited by examiner

LIQUID CRYSTAL DISPLAY PANEL, FABRICATION METHOD FOR THE SAME AND CURVED-SURFACE DISPLAY APPARATUS

CROSS-REFERENCE TO RELATED APPLICATIONS

This application claims the benefit of the priority of Chinese Patent Application No. 201710361257.3, entitled "liquid crystal display panel, fabrication method for the same and a curved-surface display apparatus", filed on May 19, 2017, disclosure of which is incorporated herein by reference.

FIELD OF THE INVENTION

The present invention relates to a technical field of fabricating liquid crystal displays, and more particular to a fabrication method for liquid crystal display panels, a liquid crystal display panel and a curved-surface display apparatus.

BACKGROUND OF THE INVENTION

Curved-surface televisions are constructed of fixing specially-designed liquid crystal display panel onto a backlight module having a specific curvature, thereby reaching a curved-surface effect in the whole screen through visual observation. Since liquid crystal display televisions employ a structure that includes backlight assembly and two-piece glass substrates, it needs to overcome a lot of technical challenges upon fabrication of curved-surface liquid crystal display panels; when liquid crystal panel comes to be curved-surface, glasses beside an color film substrate and beside an array substrate respectively bear stresses in opposite directions, it revokes a side of the color film substrate compressed, and a side of the array substrate tensioned, spacers are disposed over the color film substrate whereas correspondingly supporting color resist s of the array substrate, the two upper and lower substrates would correspondingly come to deformations while bended to be curved-surface, it makes some regions where the spacers correspondingly support are displaced toward color resist-overlaid regions, but color resist thickness of color resist-overlaid regions are more higher than a flat color resist region, a part of spacers support a place where is higher topography on the side of the array substrate. This revokes partial variation appearing in liquid crystal cell; from a macroscopic perspective expression, white fogs would appear in the left side of the panel under a dark-state screen.

SUMMARY OF THE INVENTION

The present invention provides a liquid crystal display panel that can raise a glue-coating accuracy.

A liquid crystal display panel of the present invention, comprises a color film substrate, an array substrate and a liquid crystal layer sandwiched between the color film substrate and the array substrate, said array substrate has a pixel electrode where a surface is disposed with a number of recesses and a number of terraces, said number of recesses and said number of terraces are disposed in an evenly intersectional manner, said respective recess is located at a position between two interconnected pixels, said respective recess is disposed with a first spacer, said respective terrace is disposed with a second spacer, a height of said first spacer protruded from said respective terrace is larger than a height of said second spacer protruded from said respective terrace, and said first spacers and said second spacers are extended into the liquid crystal layer, for support of between said color film substrate and said array substrate.

Among them, said array substrate comprises TFT switches, a gate insulation layer, an insulation layer covering said gate insulation layer and said TFT switches, a color resist layer stacked on the first insulation layer and a second insulation layer covering said color resist layer, said pixel electrode is stacked on the second insulation layer.

Among them, said respective terrace is a planar portion of said pixel electrode, said respective recess is an intersectional portion of the pixel electrode which is located on the color resists, and the recesses are lower than said terraces.

Among them, said liquid crystal display panel is a flexible panel.

The present invention provides a fabrication method for a liquid crystal display panel, which comprises:
providing an array substrate formed with a pixel electrode where a surface is formed with terraces and recesses lower than said terraces;
providing a half-tone mask formed with a non-transparent region, a first transparent region and a second transparent region, wherein a light transmission ratio of the first transparent region is larger than a light transmission ratio of the second transparent region;
forming a first photoresist layer on the pixel electrode of said array substrate, making the first transparent region of said half-tone mask being directly opposite to said recesses, and making said second transparent region being directly opposite to said terraces;
treating the half-tone mask as a photomask to illuminate said first photoresist layer, thereby forming a first photoresist protrusion at a position where said respective recess is located, and forming a second photoresist protrusion at a position where said respective terrace is located;
forming a second photoresist layer on the pixel electrode that is formed with the first photoresist protrusions and the second photoresist protrusions; and
making the first transparent region of said half-tone mask being directly opposite to said first photoresist protrusions, making said second transparent region being directly opposite to said second photoresist protrusions and performing illumination thereto, thereby making said first photoresist protrusions forming first spacers, and making the second photoresist protrusions forming second spacers.

Among them, said step of providing the array substrate formed with the pixel electrode where the surface is formed with the terraces and the recesses lower than said terraces, comprises, providing a substrate, forming thin film transistors on the substrate, forming a color resist layer and an insulation layer on said thin film transistors, and forming the pixel electrode on said insulation layer.

Among them, said respective terrace is a planar portion of said pixel electrode, said respective recess is an intersectional portion of the pixel electrode which is formed on same-colour pixels located on both sides within the color resist layer.

Among them, in said step of treating the half-tone mask as a photomask to illuminate said first photoresist layer, thereby forming the first photoresist protrusion at a position where said respective recess is located, and forming the second photoresist protrusion at a position where said respective terrace is located, a surface of the pixel electrode is formed on between the first photoresist protrusion and the second photoresist protrusion and is directly opposite to said half-tone mask of the non-transparent region.

Among them, said steps of making the first transparent region of said half-tone mask being directly opposite to said first photoresist protrusions, making said second transparent region being directly opposite to said second photoresist protrusions and performing illumination thereto, making said first photoresist protrusions forming the first spacers, and making the second photoresist protrusions forming the second spacers, concretely comprise, after illuminating the second photoresist layer, forming a third photoresist protrusion on said respective first photoresist protrusion, forming a fourth photoresist protrusion on the respective second photoresist protrusion, said first photoresist protrusions and the third photoresist protrusions forming said first spacers, and the second photoresist protrusions and the fourth photoresist protrusions forming said second spacers.

The present invention provides a curved-surface display apparatus, which comprises a liquid crystal display panel and a backlight module, said backlight module provides a light source for the liquid crystal display panel.

Said liquid crystal display panel of the present invention is disposed with the first spacers within the recesses between the color resists of the array substrate, and fills up the recesses of the array substrate, thereby making flatness of the pixel electrode layer of the array substrate enhanced, avoiding affecting spreading uniformity of liquid crystals, assuring a technical issue of great liquid crystal alignments, and assuring a display quality under a curved-surface state of the liquid crystal display panel.

BRIEF DESCRIPTION OF THE DRAWINGS

To clearly set forth the structural characteristics and the beneficial effects of the present invention, the following description is detailed with accompanying figures and embodiments.

DETAILED DESCRIPTION OF PREFERRED EMBODIMENTS

The followings will incorporate the inventive embodiments with its drawings, for more clearly and completely describing the technical solution of the inventive embodiments, wherein the drawings are regarded as just an exemplar expression, which just represents schematic diagrams but can not be realized as limited to the present invention.

The present invention provides a liquid crystal display panel and a curved-surface display apparatus, the curved-surface display apparatus comprises said liquid crystal display panel and a backlight module, said backlight module provides a light source for the liquid crystal display panel. The curved-surface display apparatus can be a curved-surface display or a curved-surface moving apparatus. The liquid crystal display panel can be a variable flexible panel, and certainly, also can be a curved panel.

Figure 1:
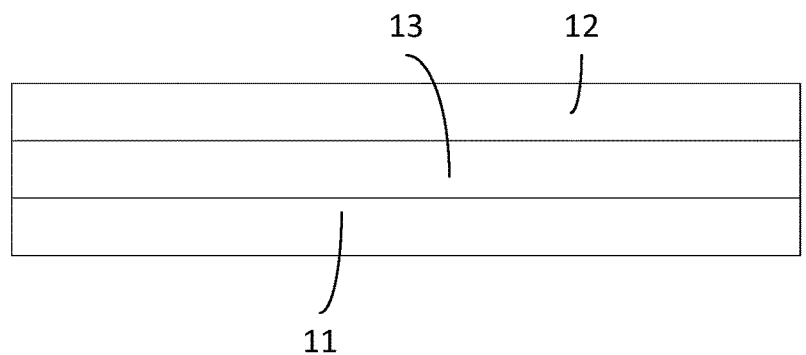
FIG. 1 depicts a schematic diagram of a liquid crystal display panel of the present invention.
Figure 2:
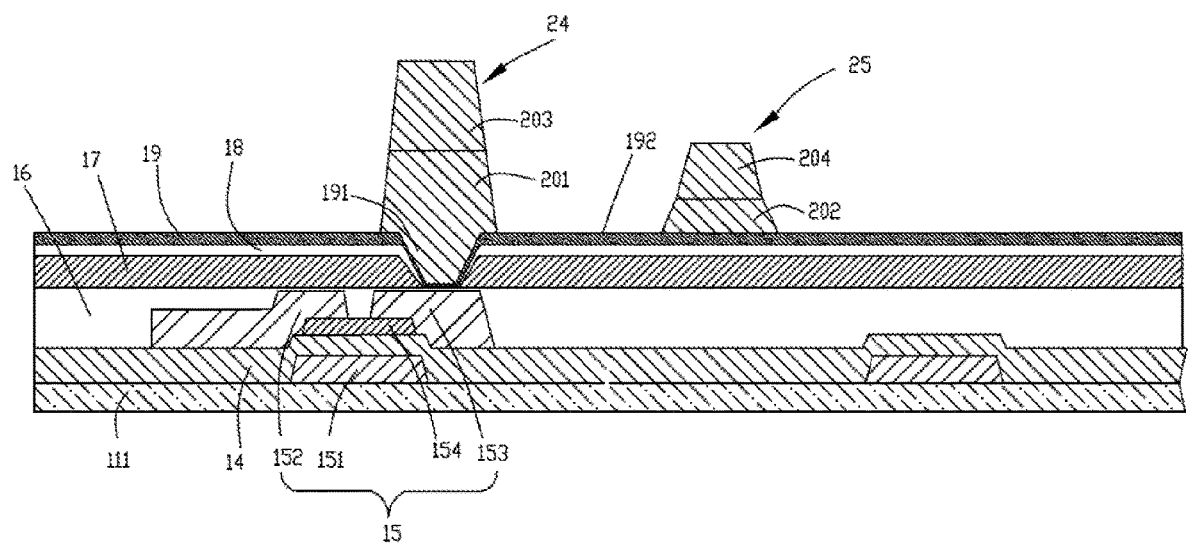
FIG. 2 depicts a laterally schematic diagram of an internal structure of the liquid crystal display panel of the present invention.

Referring to FIG. 1 and FIG. 2, in this embodiment, said liquid crystal display panel is a flexible panel. Said liquid crystal display panel comprises an array substrate 11, a color film substrate 12, and a liquid crystal layer 13 sandwiched between the color film substrate 12 and the array substrate 11, said array substrate 11 has a pixel electrode 19 where a surface is disposed thereon with a number of recesses 191 and a number of terraces 192, said number of recesses 191 and said number of terraces 192 are intersectionally arranged and commonly constitute an matrix (namely, a plurality of recesses 191 and a plurality of terraces 192 are evenly and intersectionally arranged within the same matrix), said respective recess 191 is located on an interconnection portion between two interconnected pixels 170, and also can be a position where the pixel electrode is connected with a drain electrode. According to a specific matter, the recesses are acceptable only if not affecting the entire design of the array substrate. Said respective recess 191 is disposed with a first spacer 24, said respective terrace 192 is disposed with a second spacer 25, a height of said first spacer 24 protruded from said respective terrace 192 is larger than a height of the second spacer 25 protruded from said respective terrace 192, and said first spacers 24 and said second spacers 25 are extended into the liquid crystal layer 13, for support of between said color film substrate 12 and the array substrate 11. Furthermore, said color film substrate 12 is disposed with black matrix units in array arrangement thereon, toward the liquid crystal layer. The black matrix units are directly opposite to said first spacers and said second spacers (not shown). Under a bended state of the liquid crystal display panel, even though deformation of the two substrates cause the first spacers 24 and said second spacers 25 right-and-left moved, an unevenly aligning issue will not appear in the liquid crystals.

Referring to FIG. 2, said array substrate 11 comprises a gate insulation layer 14, TFT switches 15 formed on the gate insulation layer 14, a first insulation layer 16 covering said gate insulation layer 14 and the TFT switches 15, a color resist layer 17 stacked on the first insulation layer 16, and a second insulation layer 18 covering said color resist layer 17 and stacked thereon by said pixel electrode layer 19. The respective TFT switches 15 comprise a gate electrode 151 covered by the gate insulation layer, a source electrode 152 and a drain electrode 153, wherein the gate electrode 151 is formed on a surface of a substrate 111, the gate insulation layer 14 covers a surface of the gate electrode 151, an active layer 154 is formed on a surface of the gate insulation layer 14, the source electrode 152 and the drain electrode 153 are separated from each other in a predetermined distance and formed on a surface of the active layer 154, wherein said predetermined distance is, namely a conductive channel between the source electrode 141 and the drain electrode 142. The drain electrode 153 is electrically connected with the pixel electrode 19. The pixel electrode 29 and the TFT switches 15 are formed on the substrate by semiconductor process. Realizably, the array substrate 11 is formed by utilizing five-time photolithographic processes for a transparent glass substrate, wherein the substrate may be a transparent quartz substrate, a glass substrate or a plastic substrate. The pixel electrode Px may be made of indium tin oxide (ITO).

Furthermore, said respective terrace 192 is a planar portion of said pixel electrode 19, (namely, portions corresponding to the respective color resist R, G, B are terraces) and said respective recess 191 is an intersectional portions of the pixel electrode 19 which is located on two neighboring color resists, and the recesses 191 are lower than said terraces 192.

The spacers between the array substrate 11 and the color film substrate 12 within the liquid crystal layer of said liquid crystal display panel of the present invention 10 are realized with first spacers and second spacers which have different heights. Compared with the prior art where spacers are disposed on the color film substrate thereby supporting color resists of its array substrate, when the liquid crystal panel comes to being bended, two upper and lower substrates will correspondingly come to deformations, thereby facilitating displacements of supporting portions of spacers in some regions toward an overlaid region of color resists, and a color resist thickness of the overlaid region of the color resists will be higher very much than that of flat region of the color resists, a part of the spacer support to a place where is higher topography on the lateral sides of the array substrate. In speaking of the above technical issue which revokes liquid crystal cell coming to partial variation, the present invention removes spacers on the lateral sides of the color film substrate 12, and makes spacers on the lateral sides of the array substrate. Since the first spacers and the second spacers support to the black matrix on the lateral sides of the color film substrate, the black matrix will not bring to the issues in variation and unevenness owing to having a flat topography. Moreover, the first spacers 24 are disposed within the recesses 191 between the color resists 170, the recesses are filled up, and the pixel electrode layer of the array substrate is flatted, thereby avoiding affecting spreading uniformity of liquid crystals, assuring a technical issue of great liquid crystal alignments, and assuring a display quality under a curved-surface state of the liquid crystal display panel.

Figure 3:
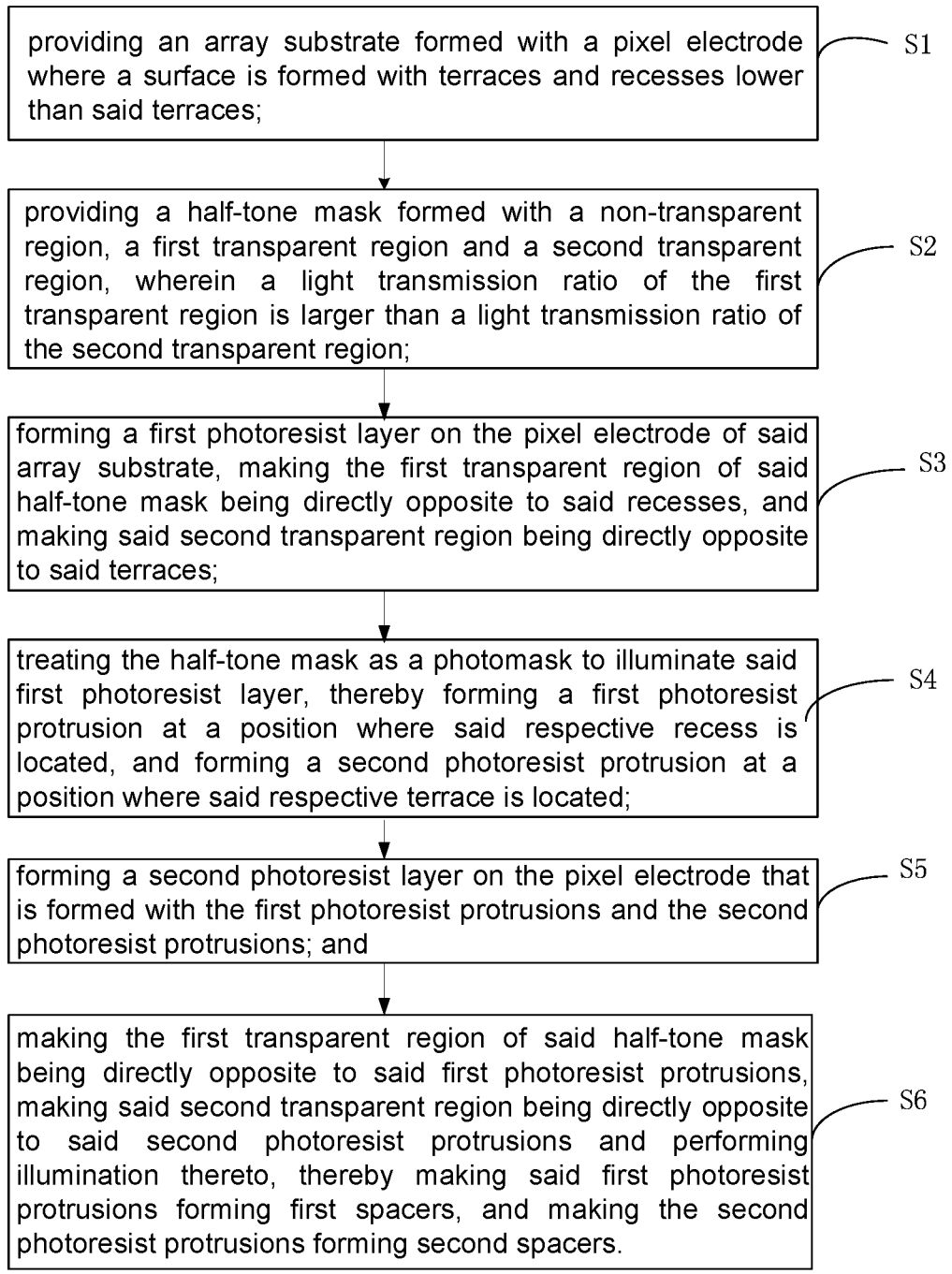
FIG. 3 depicts a flow chart of a fabrication method of the liquid crystal display panel of the present invention.
Figure 4:
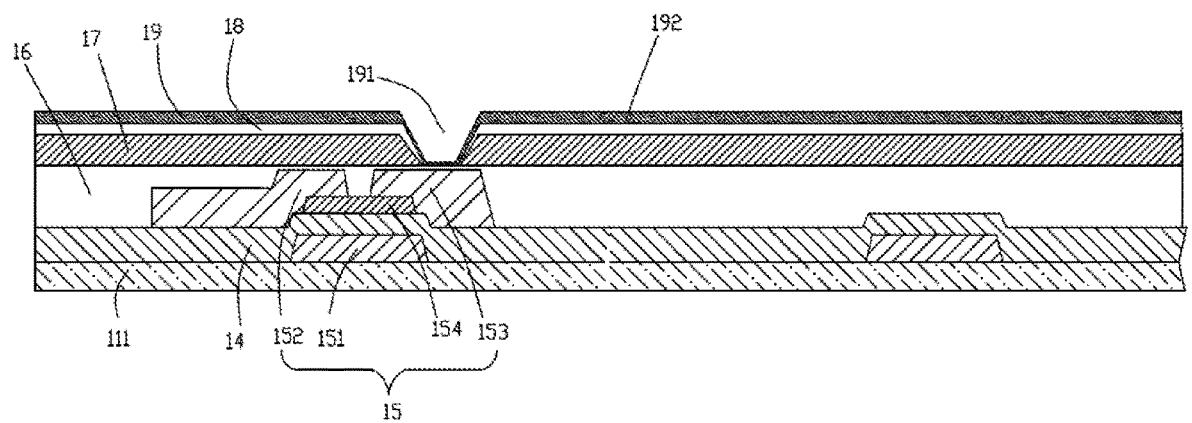
FIG. 4 and FIG. 5 depict step schematic diagrams of the fabrication method of the liquid crystal display panel.
Figure 5:
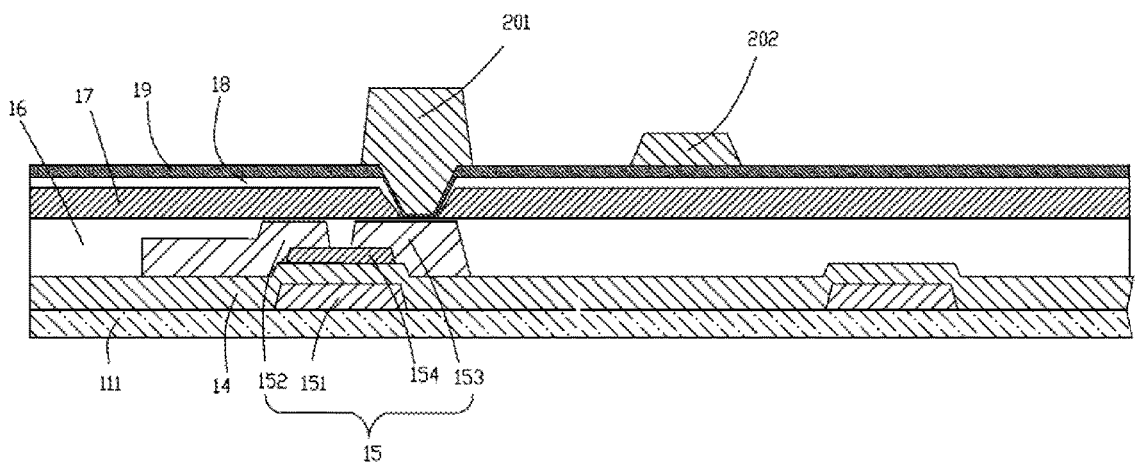

Referring to FIG. 3, the present invention further provides a fabrication method for the aforementioned liquid crystal display panel, which comprises:

as shown in FIG. 4, step S1, providing an array substrate, namely the aforementioned array substrate, formed with a pixel electrode. A surface of the pixel electrode 19 is formed with terraces 192 and recesses 191 lower than said terraces 192. Said respective terrace is a planar portion of said pixel electrode, said respective recess 191 is an intersectional portions of the pixel electrode formed on same-colour pixels located on both sides within the color resist layer;

concretely, providing a substrate 111, forming thin film transistors, namely TFT switches, on the substrate 111, forming a color resist layer 17 and an insulation layer (a second insulation layer 18) on said thin film transistors, and forming the pixel electrode on said insulation layer 19;

step S2, providing a half-tone mask 30 formed with a non-transparent region 31, a first transparent region 32 and a second transparent region 33, wherein a light transmission ratio of the first transparent region 32 is larger than a light transmission ratio of the second transparent region 33;

step S3, forming a first photoresist layer (not shown) on the pixel electrode of said array substrate 19, and making the first transparent region of said half-tone mask 32 being directly opposite to said recesses 191, and making said second transparent region 33 being directly opposite to said terraces 192;

as shown in FIG. 5, step S4, treating the half-tone mask 30 as a photomask to illuminate said first photoresist layer, thereby forming a first photoresist protrusion 201 at a position where said respective recess 191 is located, forming a second photoresist protrusion 202 at a position where said respective terrace 192 is located; a surface of the pixel electrode 19 is formed on between the first photoresist protrusion 201 and the second photoresist protrusion 202 and is directly opposite to the non-transparent region 31 of said half-tone mask 30. Said first photoresist layer is formed with a negative photoresist material. Under illumination, a portion of the first photoresist layer where the non-transparent region 31 corresponds is removed by the illumination, the light transmission ratio of the first transparent region 32 is larger than that of the second transparent region 33, since the higher the light transmission rate becomes, the lesser the portion of the photoresist is removed, a height of said corresponding first photoresist protrusion 201 is higher than that of the second photoresist protrusion 202;

step S5, forming a second photoresist layer on the pixel electrode formed with the first photoresist protrusions 201 and the second photoresist protrusions 202;

as shown in FIG. 2, step S6, making the first transparent region 32 of said half-tone mask 30 being directly opposite to said first photoresist protrusions 201, making said second transparent region 33 being directly opposite to said second photoresist protrusions and performing illumination thereto 202, thereby making said first photoresist protrusions forming first spacers 24, making the second photoresist protrusions 202 forming second spacers 25. Concretely, after illuminating the second photoresist layer, forming a third photoresist protrusion 203 on said respective first photoresist protrusion 201, forming a fourth photoresist protrusion 204 on the respective second photoresist protrusion 202, said first photoresist protrusions 201 and the third photoresist protrusions 203 forming said first spacers 24, the second photoresist protrusions 202 and the fourth photoresist protrusions 204 forming said second spacers 25. The first spacers 24 and said second spacers 25 adopt the same material during twice forming processes.

The present method further comprises providing a color film substrate which is disposed with black matrix toward a surface of said array substrate, a black matrix region of the black matrix correspond to said first spacers 24 and said second spacers 25; and bonding the array substrate onto the color film substrate, with sealing for a liquid crystal layer, thereby constituting the liquid crystal display panel.

In the present method, the half-tone mask used with the spacers (the first spacers 24, the second spacers 25) will replace a general mask used with traditional spacers, so as to easily control sizes of spacers, and decrease difference of the upper and bottom of the respective spacers. It does not only resolve a display issue regarding spacer displacement under the bended state but also greatly improve a yield problem for manufacturing the spacers, simultaneously.

The aforementioned is as the preferred embodiments of the present invention, it should be to know that, to any persons who are ordinary skilled in the art, other related change or variances not departing from principle of the present invention can be made which should be covered by the protected scope of the subject claims of the present invention.

What is claimed is:

1. A liquid crystal display panel, which comprises a color film substrate, an array substrate, and a liquid crystal layer sandwiched between the color film substrate and the array substrate, wherein said array substrate surface has a pixel electrode having a surface that is disposed with a number of recesses and a number of terraces, said number of recesses and said number of terraces being disposed in evenly intersectional arrangement, said respective recess being located at a position between two interconnected pixels, wherein said respective recess is disposed with a first spacer, and said respective terrace is disposed with a second spacer, such that said first spacer that is disposed in said respective recess has a distal end protruding beyond said respective terrace and a height of the distal end of said first spacer relative to said respective terrace is larger than a height of a distal end of said second spacer protruded from said respective terrace, said first spacers and said second spacers extending into the liquid crystal layer for supporting between said color film substrate and said array substrate.

2. Said liquid crystal display panel as claimed in claim 1, wherein said array substrate comprises TFT switches, a gate insulation layer, an insulation layer covering said gate insulation layer and said TFT switches, a color resist layer stacked on the first insulation layer, and a second insulation layer covering said color resist layer, said pixel electrode is stacked on the second insulation layer.

3. Said liquid crystal display panel as claimed in claim 2, wherein said respective terrace is a planar portion of said pixel electrode, said respective recess is an intersectional portion of the pixel electrode which is located on color resists of said color resist layer, and the recesses are lower than said terraces.

4. Said liquid crystal display panel as claimed in claim 1, wherein said liquid crystal display panel is a flexible panel.

5. A curved-surface display apparatus, which comprises a liquid crystal display panel and a backlight module, wherein said backlight module provides a light source for the liquid crystal display panel; and said liquid crystal display panel comprises a color film substrate, an array substrate and a liquid crystal layer sandwiched between the color film substrate and the array substrate, wherein said array substrate has a pixel electrode having a surface that is disposed with a number of recesses and a number of terraces, said number of recesses and said number of terraces being disposed in evenly intersectional arrangement, said respective recess being located at a position between two interconnected pixels, wherein said respective recess is disposed with a first spacer, and said respective terrace is disposed with a second spacer, such that said first spacer that is disposed in said respective recess has a distal end protruding beyond said respective terrace and a height of the distal end of said first spacer relative to said respective terrace is larger than a height of a distal end of said second spacer protruded from said respective terrace, and said first spacers and said second spacers extending into the liquid crystal layer for supporting between said color film substrate and said array substrate.

6. Said curved-surface display apparatus as claimed in claim 5, wherein said array substrate comprises TFT switches, a gate insulation layer, an insulation layer covering said gate insulation layer and said TFT switches, and a color resist layer stacked on the first insulation layer and a second insulation layer covering said color resist layer, said pixel electrode is stacked on the second insulation layer.

7. Said curved-surface display apparatus as claimed in claim 6, wherein said respective terrace is a planar portion of said pixel electrode, said respective recess is an intersectional portion of the pixel electrode which is located on the color resists, and the recesses are lower than said terraces.

8. Said curved-surface display apparatus as claimed in claim 5, wherein said liquid crystal display panel is a flexible panel.

\* \* \* \* \*